March 17, 1953     J. F. JOY     2,631,522
COFFEE MAKER

Filed Jan. 2, 1948     2 SHEETS—SHEET 1

Inventor:
Joseph F. Joy.
By Charles F. Osgood,
Attorney.

March 17, 1953 J. F. JOY 2,631,522
COFFEE MAKER

Filed Jan. 2, 1948 2 SHEETS—SHEET 2

Inventor:
Joseph F. Joy.
by Charles F. Osgood.
Attorney.

Patented Mar. 17, 1953

2,631,522

UNITED STATES PATENT OFFICE 2,631,522

COFFEE MAKER

Joseph F. Joy, Pittsburgh, Pa., assignor to Joy Manufacturing Company, Pittsburgh, Pa., a corporation of Pennsylvania Application January 2, 1948, Serial No. 306

4 Claims. (Cl. 99—287)

This invention relates to coffee makers and more particularly to an improved coffee pot having a movably mounted coffee container to effect improved circulation of water through the ground coffee, effectively to extract the flavor therefrom during the making process.

It is an object of the present invention to provide an improved coffee maker adapted for association with a source of heat and having an improved container for the ground coffee movably mounted within the coffee pot whereby improved circulation of water through the ground coffee is effected through the ebullient action of the heated water in the pot. Another object is to provide an improved coffee maker having the container for the ground coffee mounted in an improved manner within the coffee pot for rotation about a vertical axis whereby the boiling water, as it circulates within the pot, may effectively act on the container to cause rotation thereof. Yet another object is to provide an improved coffee maker having a perforated container for the ground coffee and improved means for mounting the container within the coffee pot for rotation about an upright axis whereby the ground coffee in the container has its flavor effectually extracted during the making process. Still another object is to provide an improved perforated container for the ground coffee of a coffee maker wherein the container serves as a strainer for the grounds. A still further object is to provide an improved coffee maker having an improved perforated container for the ground coffee and having improved means thereon whereby the water is caused to swirl through the ground coffee in an effective manner by motion of the container as a result of the action thereon of the boiling water in the coffee pot. Another object is to provide an improved coffee maker having a foraminated container for the ground coffee so arranged and constructed that the action of the boiling water in the coffee pot serves to rotate the container, thereby insuring circulation of the water in the pot through the container and the ground coffee, resulting in more efficient making of coffee. A still further object is to provide an improved coffee maker having a perforated container for ground coffee together with improved means for suspending the container within the coffee pot for rotation about a vertical axis and provided with propeller blades or vanes which are adapted to be acted upon by the heated water which circulates in the coffee pot as the result of convection for causing rotation of the container so that the effective circulation of the water through the ground coffee confined within the container is assured. Another object is to provide an improved coffee making device of a simple and inexpensive design, applicable to a conventional coffee pot, and which is economical and efficient in operation. These and other objects and advantages will appear more fully in the course of the ensuing description.

In the accompanying drawings there is shown for purposes of illustration one form which the invention may assume in practice.

Figure 1:
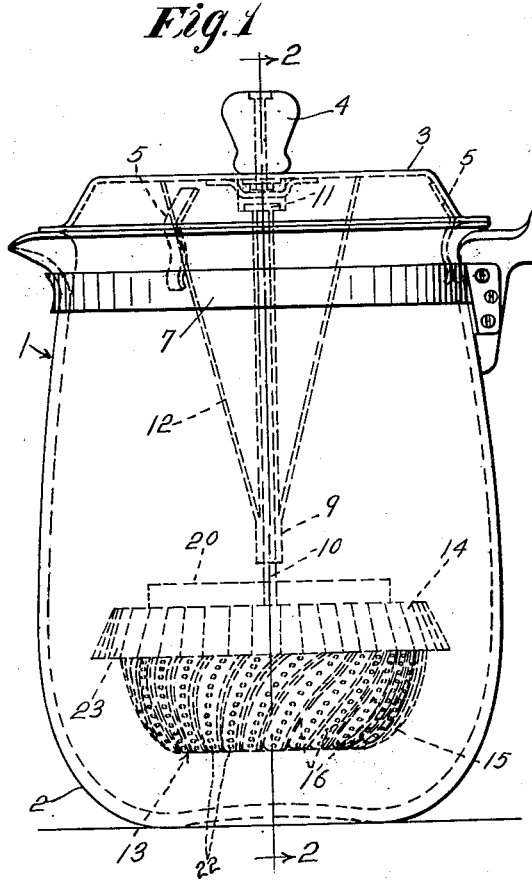
Fig. 1 is a side elevational view of a coffee maker constructed in accordance with a preferred illustrative embodiment of the invention.
Figure 2:
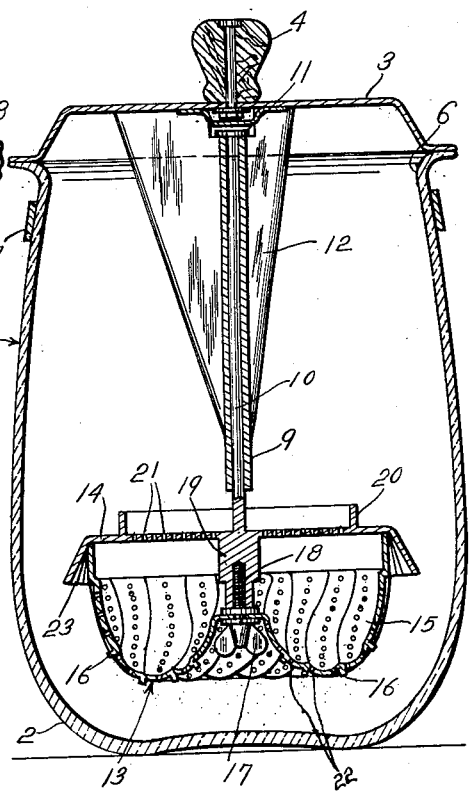
Fig. 2 is a central vertical sectional view taken on line 2—2 of Fig. 1.
Figure 3:
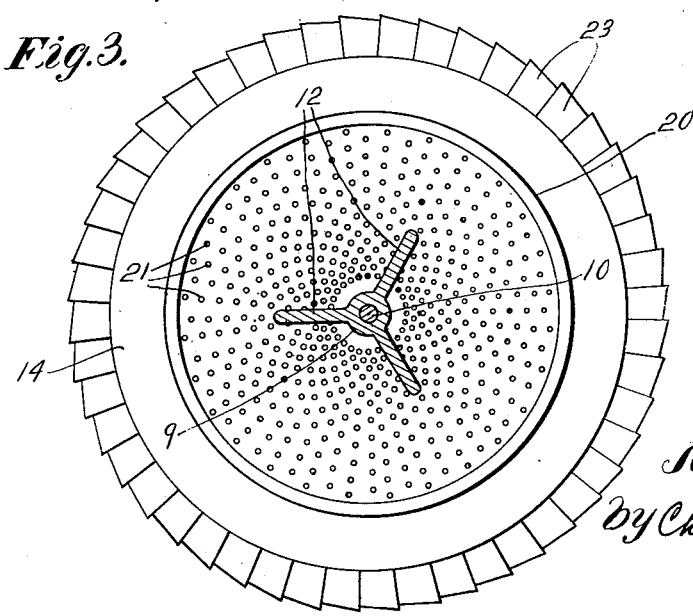
Fig. 3 is an enlarged detail horizontal sectional view taken on line 3—3 of Fig. 2, showing the container for the ground coffee in top plan.
Figure 4:
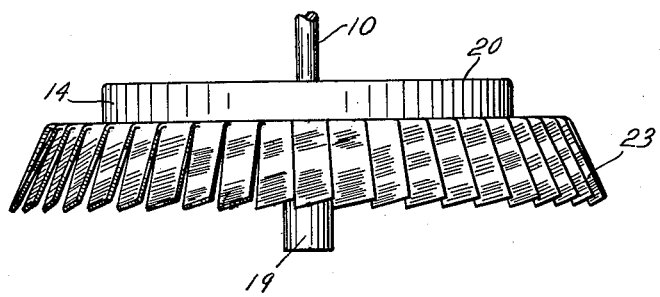
Fig. 4 is an enlarged side view of the upper part of the container showing the propeller blades or vanes.
Figure 5:
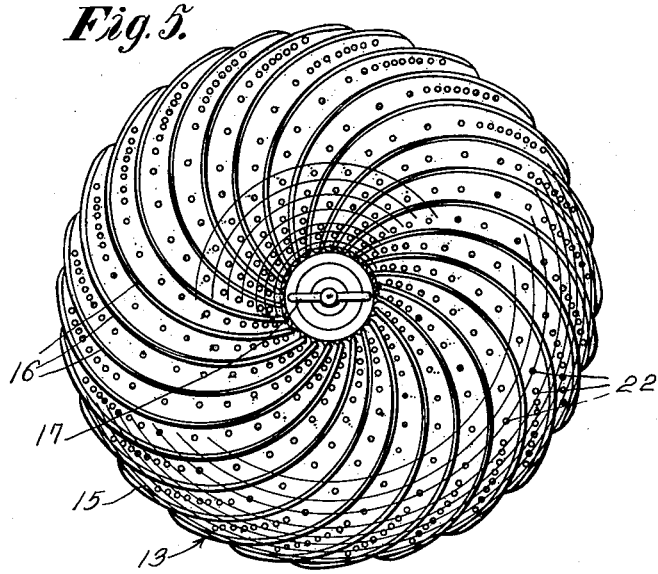
Fig. 5 is a bottom plan view of the lower detachable part or cover of the container, showing the spiral ribs.
Figure 6:
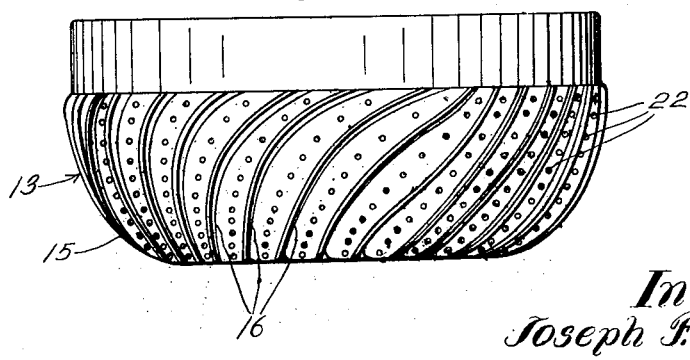
Fig. 6 is a side view of the cover shown in Fig. 5.

In this illustrative construction there is shown a coffee maker, generally designated 1, comprising a coffee receptacle or pot 2, preferably composed of heat treated glass, and adapted to be associated with a suitable source of heat and having a cover 3 provided with a suitable knob-like handle 4. The cover 3 preferably has several spring fingers or clips 5 projecting from the bottom thereof, and these fingers yieldingly engage the inside of the pot below an inner annular portion 6 of reduced diameter for holding the cover firmly in place. Encircling the upper reduced external portion of the pot or receptacle is an annular strap 7 suitably held in place and provided with a handle 8. Secured to the bottom of the cover is a tubular bearing sleeve or bearing tube 9 which projects centrally vertically within the pot or receptacle when the cover is in place, as shown in Fig. 2, and rotatably mounted on a vertical axis in this bearing sleeve or tube is a rotatable spindle or shaft 10 having an enlarged upper head 11 overlying and resting on the upper end of the sleeve. This bearing sleeve or tube is suitably laterally braced by spaced radial ribs 12, shown in cross section in Fig. 3, which are herein preferably integral with the cover 3. Suspended within the coffee pot or receptacle from the shaft or spindle 10 is a perforated container, generally designated 13, for the ground coffee. The container is of an improved design and may be composed of any suitable foraminated or reticulated screenlike material, preferably metal, and may assume various forms, but herein preferably comprises a circular upper body part 14 and a detachable circular lower part in the form of a bottom cover 15. The bottom cover 15 is preferably corrugated or spirally ribbed or vaned at 16 for a purpose later described and may be attached to the upper container part in various manners but is herein held in position against the underside of the upper part as by a detachable wing-screw 17 threaded at 18 within an opening in the central thickened portion 19 of the upper part. The upper part has an annular strengthening rib 20 at its upper side and is formed with numerous perforations or orifices 21, while the cover is similarly perforated at 22. In this improved construction, one container part, herein preferably the upper container part, is formed with peripheral propeller blades or vanes 23, suitably cut and bent, and so arranged and constructed that the heated water in the coffee pot or receptacle, as the result of ebullition, acts on the vanes to rotate the container in a clockwise direction, as viewed in Fig. 3, in the manner of a turbine wheel, thus causing circulation of the water through the ground coffee within the container, effectively and economically to extract the flavor from the ground coffee. The boiling water in the pot also acts on the spiral ribs or vanes 16 on the container part 15 in such manner as to supplement the turning action of the water on the vanes 23. Either the vanes 23 or the spiral ribs 16 may alone serve to cause rotation of the container, however. Instead of suspending the rotatable container from the pot-cover, it may be rotatably supported within the pot in various manners, such as by a suitable support resting on the pot-bottom.

The manner of use of the improved coffee maker will be clearly apparent from the description given. The coffee pot or receptacle 2 may be filled with water to the desired level and the pot may then be associated with a suitable source of heat. The cover 3 may, if desired, at that time be removed from the pot, and the bottom cover 15 of the container may be removed by detaching the wing-screw 17, and the proper quantity of ground coffee may then be placed therein. The bottom cover is then replaced in position against the upper container part and secured in place by the wing-screw. The container may then be inserted within the coffee pot or receptacle and the cover 3 set in proper position on the pot so that the perforated container is freely suspended in position in the water relatively near the bottom of the pot, in the manner shown, for rotation about the vertical axis of the spindle 10. After the perforated container has been placed in position within the coffee pot so that it is submerged within the water, and the water begins to boil, the currents that will be set up in the water, due to convection, will act on the spiral ribs or vanes 16 and the propeller blades or vanes 23 of the container 13, in the manner of a turbine wheel, thereby causing rotation of the container. During boiling, the water will circulate through the perforations in the container as the latter revolves, thereby swirling the water through the ground coffee confined within the container so that the flavor of the ground coffee is effectively extracted therefrom. Since the coffee grounds are confined within the perforated container, the latter serves as a strainer, and when the preparation of the coffee is completed, the grounds may be readily removed with the container from the pot.

As a result of this invention, an improved coffee maker is provided whereby coffee may be prepared effectively and economically. By arranging the perforated container for the ground coffee within the pot for rotation about a vertical axis and by the provision of the propeller blades and vanes arranged in the manner disclosed on the container-periphery, the container is rotated as a result of the ebullition of the water in the pot, thereby causing the water to swirl through the ground coffee so that the flavor is effectively extracted therefrom. By the particular arrangement of the rotating container on an upright axis and by the particular formation of the blades and vanes, full advantage of the circulation of the boiling water in the pot is obtained so that the container is effectively rotated and causing the water to be effectively circulated through the coffee grounds during preparation of the coffee. By suspending the container from the cover of the pot, the container may be readily placed within or removed from the pot when desired. The container and its associated structure is relatively simple, permitting manufacture at relatively low cost, and may be readily applied to a coffee pot of a conventional design. These and other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a coffee maker, the combination comprising a receptacle adapted to contain water and adapted for association with a suitable source of heat for heating the water therein, a perforated container for ground coffee adapted to be arranged in the receptacle to revolve about an upright axis, means for supporting said rotary container in said receptacle for rotation about an upright axis, and propelling means on said container so arranged and constructed that the container is rotated as a result of the action of the boiling water thereon, said propelling means including spiral ribs on the bottom of said container and a series of peripheral vanes about the upper portion of said receptacle.

2. In a coffee maker, the combination with a receptacle adapted to contain water and adapted for association with a suitable source of heat for effecting boiling of the water in the receptacle, of a rotatable perforated container for ground coffee adapted to be positioned in said receptacle below the water level, means for supporting said rotatable container for rotation about a vertical axis within said container, and propelling means respectively on the bottom and about the periphery of said container and immersed in the water in the receptacle whereby said container is rotated as the result of the action of the boiling water on said propelling means.

3. In a coffee maker, the combination with a receptacle adapted to contain water and adapted for association with a suitable source of heat for effecting boiling of the water in the receptacle, of a rotatable perforated container for ground coffee adapted to be positioned in said receptacle below the water level, means for supporting said rotatable container for rotation about a vertical axis within said container, and propelling means respectively on the bottom and about the periphery of said container and immersed in the water in the receptacle whereby said container is rotated as the result of the action of the boiling water on said propelling means, said propelling means on said container bottom comprising spiral vanes.

4. In a coffee maker, the combination with a receptacle adapted to contain water and adapted for association with a suitable source of heat for effecting boiling of the water in the receptacle, of a rotatable perforated container for ground coffee adapted to be positioned in said receptacle below the water level, means for supporting said rotatable container for rotation about a vertical axis within said container, and propelling means respectively on the bottom and about the periphery of said container and immersed in the water in the receptacle whereby said container is rotated as the result of the action of the boiling water on said propelling means, said propelling means at the container periphery comprising a series of peripheral vanes.

JOSEPH F. JOY.

REFERENCES CITED

The following references are of record in the file of this patent:

UNITED STATES PATENTS

| Number | Name | Date |
| --- | --- | --- |
| 175,050 | Dejey | Mar. 21, 1876 |
| 374,270 | Richards | Dec. 6, 1887 |
| 630,666 | Cummings | Aug. 8, 1899 |
| 1,572,861 | Larrey | Feb. 9, 1926 |
| 1,668,454 | Hake | May 1, 1928 |

FOREIGN PATENTS

| Number | Country | Date |
| --- | --- | --- |
| 2,992 | Great Britain | 1880 |
| 76,092 | Germany | July 9, 1894 |